United States Patent [19]

Ando et al.

[11] 3,848,328

[45] Nov. 19, 1974

[54] CHARGE TRANSFER DEVICE

[75] Inventors: Tetsuo Ando, Ebina-machi; Yoshimi Hirata, Hatano, both of Japan

[73] Assignee: Sony Corporation, Tokyo, Japan

[22] Filed: Dec. 5, 1972

[21] Appl. No.: 312,332

[30] Foreign Application Priority Data

Dec. 11, 1971 Japan ............................ 46-100410

[52] U.S. Cl. ...................... 29/578, 29/580, 29/591, 357/24

[51] Int. Cl. ...................... H01l 11/00, H01l 15/00

[58] Field of Search ..... 317/235 B, 235 G, 235 AK, 317/235 HJ; 307/221 D, 304; 29/579–591; 148/175

[56] References Cited

OTHER PUBLICATIONS

Electronics, "The New Concept for Memory and Imagine: Charge Coupling" by Altman, pages 50–59, June 21, 1971.

IBM Tech Discl Bul., "Fabrication of Monolithic Integrated Circuit Structure ..." by Ames et al., pages 110–111, June 1966.

Phillips Res Repts., "Local Oxidation of Silicon ..." by Appels et al., pages 118–132, April 1970.

IBM Tech Discl Bul., "MOSFET Structures Using Selective Epitaxial Growth" by Terman, pages 3279–80, April 1971.

*Primary Examiner*—Andrew J. James

*Attorney, Agent, or Firm*—Hill, Gross, Simpson, Van Santen, Steadman, Chiara & Simpson

[57] ABSTRACT

An information storage and transfer device which has a plurality of capacitors and switching MOS–FET's between said capacitors, in which there are a plurality of island areas which serve as source and drain regions of the MOS–FET and which island areas are separated by a plurality of gutters.

2 Claims, 24 Drawing Figures

FIG. 1 (PRIOR ART)
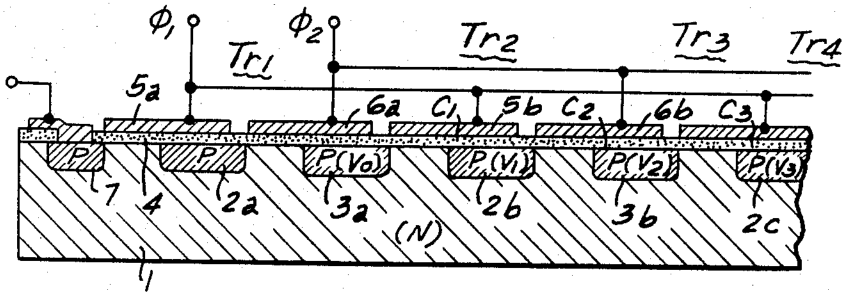
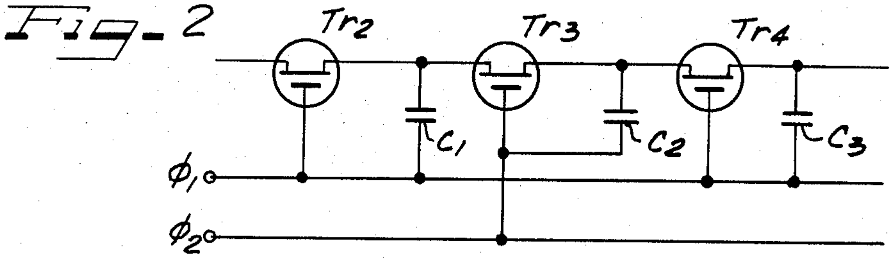
FIG. 2
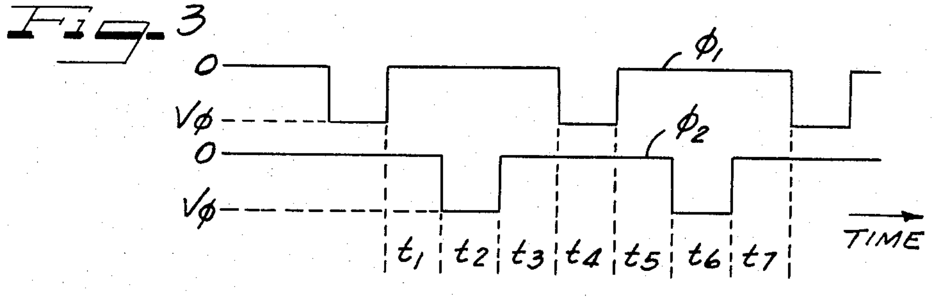
FIG. 3
FIG. 4
| | $V_1$ | $V_2$ |
|---|---|---|
| $t_1$ | 0 | $V\phi - Vte$ |
| $t_2$ | $V\phi - Vte$ | $V\phi$ |
| $t_3$ | $V\phi - Vte$ | 0 |
| $t_4$ | $V\phi - Vte$ | $V\phi - Vte$ |
| $t_5$ | $V\phi - Vte$ | $V\phi - Vte$ |
| $t_6$ | $V\phi-(Vte-\Delta Vte)$ | $2V\phi-(Vte+\Delta Vte)$ |
| $t_7$ | $V\phi-(Vte+\Delta Vte)$ | $V\phi-(Vte-\Delta Vte)$ |

CHARGE TRANSFER DEVICE

BACKGROUND OF THE INVENTION

This invention relates to an information storage and transfer device, and more particularly to a monolithic semiconductor apparatus adapted for storing and sequentially transferring electric charges which represent information.

Such devices are often called "bucket-brigade devices" and certain original forms of such devices were first disclosed at the 1970 International Solid State Circuits Conference by F. L. J. Sangster of Philips Research Laboratory. Subsequently, a United States Patent disclosing an original of such device was issued on Nov. 16, 1971 as U.S. Pat. No. 3,621,283.

The general concept of a bucket-brigade device, hereinafter sometimes referred to as "B.B.D.", was also described in an article in the "Philips Technical Review", vol. 31, 1970, No. 4, pp. 98–110, entitled "The 'bucket-brigade delay line', a shift register for analogue signals".

In this article, the underlying concept of the B.B.D. was described by pointing out that the principle of such a register is quite simple. Sampled values of an analogue signal are stored in the form of charges on a series of capacitors. Between each of these storage capacitors is a type of "switch" that transfers the charges from one capacitor to the next on a command from a clock pulse. Since each storage capacitor cannot take up its new charge until it has passed on the old one, only half the capacitors carry information and the ones in betweeen are empty.

The B.B.D. is utilized as shift registers, memory devices or image sensors built in one semiconductor chip.

OBJECTS OF THIS INVENTION

It is an object of the present invention to provide an improved device for information storage and transfer.

It is another object of the invention to provide an improved "bucket-brigade device" utilizing an improved form of MOS–FET as switching devices. The term "MOS–FET" as used herein refers to a metal-oxide-semiconductor field effect transistor.

It is another object of the invention to provide improved transfer efficiency of the information of such a device.

BRIEF DESCRIPTION OF THE DRAWINGS

FIG. 1 is a diagrammatical cross-sectional view of one form of prior art B.B.D.;

FIG. 2 is a circuit with which the device of FIG. 1 may be employed;

FIG. 3 diagrammtically illustrates the functioning of the device with respect to time;

FIG. 4 is a chart to explain a phenomenon which occurs in the prior art device of FIG. 1;

FIG. 7 is an enlarged fragmentary view of a portion of FIG. 6 showing this invention; and .

DESCRIPTION OF THE PRIOR ART

Figure 5:
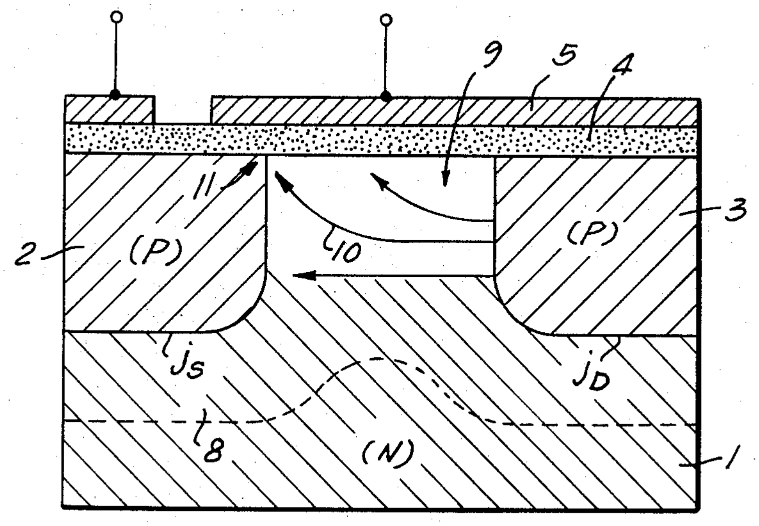
Fig-5 (PRIOR ART)
FIG. 5 is an enlarged fragmentary view of a portion of the prior art B.B.D. shown in FIG. 1.

FIG. 1 shows in a diagrammatic cross-sectional view a known form of B.B.D. It comprises a semiconductor body 1 of silicon having an N-type conductivity, a plurality of P-type areas, the first group of island areas 2*a*, 2*b*, 2*c* and a second group 3a, 3*b* at a major face of the silicon substrate 1, arranged uni-directionally, an insulating layer 4, for example silicon-dioxide ($SiO_2$) covering the plural areas and the major surface of the silicon, a plurality of metal layers, including a first group 5*a*, 5*b* and 5*c* and a second group 6*a* and 6*b*, on the insulating layer 4, an input terminal area 7 of P-type conductivity making a P-N junction with the substrate 1. The first group of metal layers 5*a*, 5*b*, and 5*c* are electrically connected to each other, where the first gate potential $\phi_1$ is applied simultaneously.

The second group of metal layers 6*a* and 6*b* are electrically connected to each other, where the second gate potential $\phi_2$ is applied simultaneously.

The first metal-oxide-semiconductor field effect transistor (MOS-FET) *Tr*1 consists of one of the first island group 2*a* (source region), one of the second island group 3*a* (drain region), a silicon-dioxide layer 4 and one of the second metal group 6*a* (gate electrode).

The second MOS-FET *Tr*.2 similarly consists of the islands 3*a* (source region), 2*b* (drain region), isolating layer 4 and the metal layer 5*b* (gate electrode).

The third and fourth transistors also similarly consist of corresponding elements, as shown in FIG. 1.

These plural transistors operate as "switches", as described in the aforesaid article in the "Philips Technical Review".

Capacitors consist of metal-insulating layer — semiconductor island components, such as C1, C2 and C3. The term "metal-insulating layer — semiconductor" will herein be referred to as "MIS".

FIG. 2 shows the equivalent circuit of the B.B.D. of FIG. 1 including capacitors C1, C2, and C3 and MOS—FET's *Tr*2, *Tr*3, *Tr*3.

In FIG. 3, potential diagrams are shown in full lines. Potentials $\phi_1$ and $\phi_2$ applied to gate lines are select between 0 volt and negative V$\phi$ volt sequentially in order to transfer charges, such as minority carriers which represent information.

When the potential is of higher voltage, such as, 0 (zero) volts, the MOS–FET switches are closed and the capacitors store the information. When the potential is of lower voltage such as V$\phi$ volt, the switches are opened and the capacitors are discharged.

In the periods *t*1, *t*3, *t*5 and *t*7, the higher voltage (i.e., zero), is applied on both potentials $\phi$1 and $\phi$2, and the information is stored in each capacitor.

In periods *t*2 and *t*6, the lower pulse V$\phi$ volt is applied on only the potential $\phi$2.

On the other hand at the period *t*4, V$\phi$ volt is applied on only the potential $\phi$1.

The information is transferred in these periods *t*2, *t*4 and *t*6 from a certain capacitor to the next.

The maximum electric charge which is stored and transferred is $Q=-(V\phi-Vte)\ C$, where V$\phi$ is the negative gate voltage shown in FIG. 3, Vte is the effected threshold voltage of the MOS-FET *Tr*1 etc. and C is the capacitance of the capacitor C1 etc. in FIGS. 1 and 2.

However, the transfer or transport efficiency is not enough for high speed clock pulses such as 10 MHZ or greater which are used in video signal systems.

The changing value of voltage of island areas is shown in the chart of FIG. 4 corresponding to each of the periods $t1$, $t2$ and so forth.

The information has a lot of states between the maximum value $Q\max = -(V\phi - Vte)C$ and the minimum value $Q\min = 0$. When the charges $Q\max = [1]$ and $Q\min = [0]$ are transferred from the island area 2*b* to 3*b*, the source and drain regions of *Tr*3, we observed that the information [0] is changed during transfer period.

First of all in period $t1$, the capacitor C1 is filled with information charges and the area 2*b* is held at $V1=0$ volt, the capacitor C2 is vacant and the area 3*b* is held at $V2 = V\phi - Vte < 0$.

In transfer period $t2$, $\phi 2 = V\phi < 0$, the channel occurs between the source 2*b* and the drain 3*b*, and charges are transferred through this channel. As a result, the area 2*b* becomes vacant and $V1 = V\phi - Vte$, the area 3*b* becomes filled and $V2 = v\phi$.

In the period $t3$, $\phi 2 = 0$, $V1 = V\phi - Vte$ and $V2 = 0$, where charges are stored in the capacitor C2.

In the period $t4$, $\phi 1 = V\phi$, the information [1] changes from the capacitor C2 to the next capacitor C3 and the next information [0] appears in the capacitor C1 simultaneously.

In the period $t5$, $V1 = V\phi - Vte$ is holding the information [0] in the capacitor C1 and the capacitor C2 is vacant.

In the next period $t6$, the information [0] is transferred from C1 to C2. In this period, the modulation of the effective threshold voltage *Vte* is obtained and V1 becomes $V\phi - (Vte - \Delta Vte)$ and V2 becomes $2V\phi - (Vte + \Delta\ Vte)$.

In the period $t7$, V1 becomes $V\phi - (Vte + \Delta Vte)$ and V2 becomes $V\phi - (Vte - \Delta\ Vte)$. Ideally, V1 should be $V\phi - vte$ and V2 should be also $V\phi - Vte$.

It is believed that the cause of the reduction of the efficiency lies in the fact that the potential of the drain region has an effect on the value Vte and the maximum value of the transferred information.

The structure of the device is considered to cause these effects on the value Vte at the channel region of the MOS–FET, especially due to the position of the drain region of each MOS–FET.

The effect of a drain modulation is explained in FIG. 5, where an enlarged partial view of the B.B.D. of FIG. 1. Only one MOS-FET is shown there, and this comprises a semiconductor substrate 1 of N-type, one of the first group of island areas 2 of P-type semiconductor material, one of the second group of island area 3 of P-type semiconductor material, an insulating layer 4 ($SiO_2$), a gate metal electrode 5, a P-N junction *j*S and *j*D, a depletion layer 8 caused by the back-biased P-N junctions, a channel region 9 between island areas, a line of electric force are shown at 10.

When the line of electric force 10 extends to the edge 11 of the junction *j*S, it changes the value *Vte*.

To enlarge the distance between two neighboring junctions *j*S and *j*D, that is, the channel length, results in reducing the modulation or the influence of the line of electric force.

However, a long channel reduces the current amplification factor of the MOS-FET and causes also the reduction of the transfer velocity of the information.

DESCRIPTION OF THE PREFERRED EMBODIMENT

Figure 6:
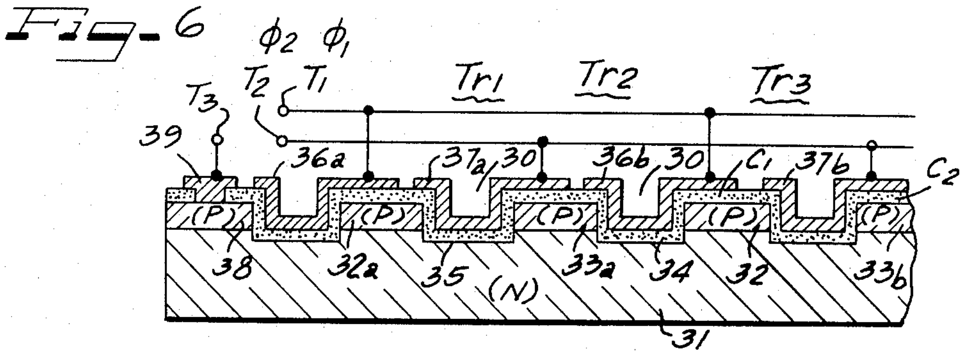
FIG. 6 is a diagrammatic cross-sectional view of a charge transfer device embodying the present invention.
Figure 8:
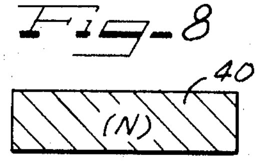
FIGS. 8 to 24 diagrammatically illustrate process steps by which the structure of the present invention may be fabricated.
Figure 14:
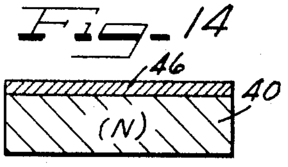
Figure 20:
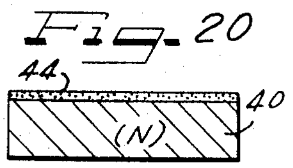

FIG. 6 shows the improved B.B.D. of this invention. As shown, there is provided a semiconductor body 31, such as N-type silicon substrate; a plurality of gutters 30 in the body 31; a plurality of the island areas 32*a*, 33*a*, 32*b* and 33*b* of P-type silicon arranged unidirectionally on the N-type substrate; an insulating layer 35 such as silicon-dioxide ($SiO_2$), on the uneven surface of the silicon making channel region 35 between the P-type area islands; a plurality of metal layers 36*a*, 37*a*, 36 *b* and 37*b* disposed on the $SiO_2$ layer 34 the first group of metal electrodes 36*a* and 36*b* being connected to each other by a lead extending to the first end terminal T1; the second group of metal electrodes 37*a* and 37*b* being connected by another lead extending to the second end terminal T2; an input area 38 of P-type silicon; and an input electrode 39 connected to the third terminal T3.

A plurality of MOS-FET's *Tr*1, *Tr*2 and *Tr*3 are formed and arrayed uni-directionally.

The first transistor *Tr*1 consists of P-type island 32*a* forming a source region, a next island 33*a* forming a drain region, an insulating layer 34 forming a gate insulator and a metal layer 37*a* forming a gate electrode. Other transistors are similarly formed.

The equivalent circuit of the B.B.D. is also represented in FIG. 2. This is also operated in accordance with the diagram shown in FIG. 3. Selected potentials $\phi 1$ and $\phi 2$ are applied on terminals T1 and T2 respectively.

Figure 7:
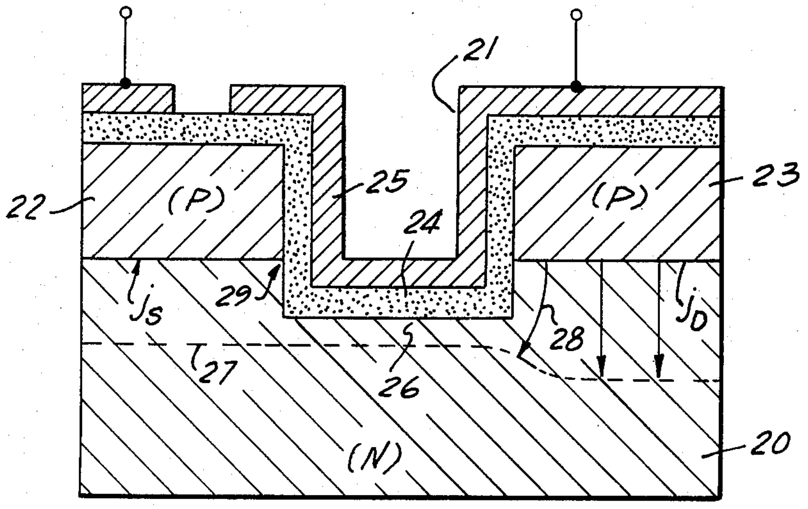

FIG. 7 shows an enlarged partial view of the B.B.D. of the present invention and comprises an N-type silicon substrate 20; two neighboring island areas 22 and 23 of P-type an insulating layer 24 ($SiO_2$) which covers the uneven surface of the silicon; a metal gate electrode 25 which forms the channel region 26 beneath the $SiO_2$ layer 24; and a depletion layer 27 which is formed when P-N junctions *j*S and *j*D are back-biased by transferring charge and gate potential. In this structure the array of P-type island areas 22 and 23 are deposited higher than the channel region 26, forming the gutter 21 between two island areas 22 and 23. The shape of the P-N junction *j*S, *j*D is flat and there is no curvature in the cross-sectional direction along the array of MOS–FETs.

The line of electric force 28 is shown in the figure, and has a negligible small influence on the channel region and the value *Vte*, because the line 28 merely extends to the edge portion 29 of the source area 22 from the drain area 23.

As a result of this structure, the small amount $\Delta\ Vte$ in FIG. 4 becomes approximately zero, and the constant value of *Vte* makes the transfer efficiency of the charge larger than the prior art without reduction of the transport velocity.

METHOD OF FABRICATING THE STRUCTURE OF THE PRESENT INVENTION

Figure 9:
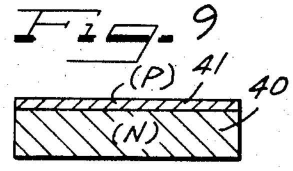
Figure 10:
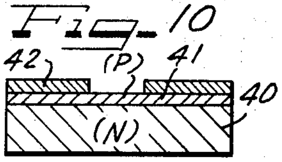
Figure 16:
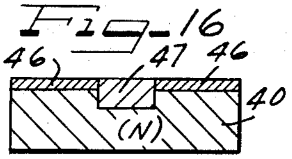
Figure 22:
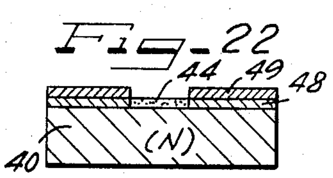
Figure 11:
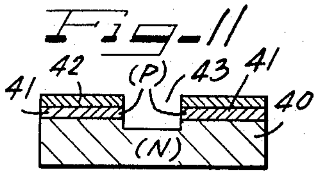
Figure 12:
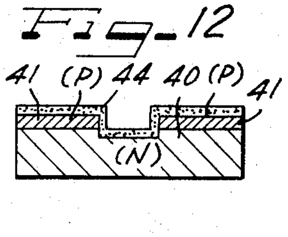
Figure 13:
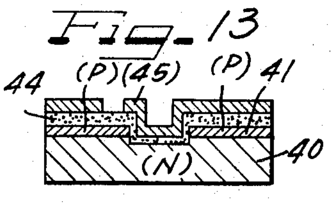
Figure 19:
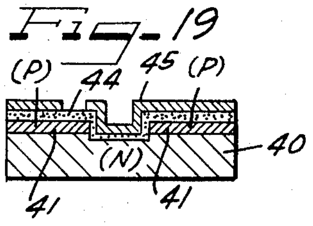

A first method of fabrication is shown in FIG. 8 to FIG. 13 and will now be described. In the N-type silicon 40 (FIG. 8), a P-type layer 41 is formed by a diffusion technique (FIG. 9). A thermal silicon-dioxide ($SiO_2$)

layer 42 is formed on the P-type layer and etched selectively to expose the silicon surface (FIG. 10). The P-type layer 41 is selectively etched chemically so that the N-type substrate is exposed (FIG. 11) and a plurality of islands are formed arrayed unidirectionally. A second insulating layer 44 is formed by oxidation covering the exposed N-type surface and P-type islands (FIG. 12). A metal layer, for example aluminum (Al), is deposited on the second insulating layer 44 and selectively etched forming a plurality of gate electrodes 45 (FIG. 13).

Figure 15:
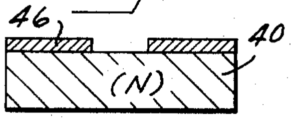
Figure 17:
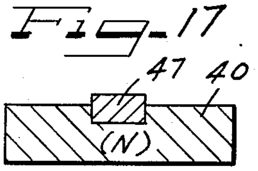
Figure 18:
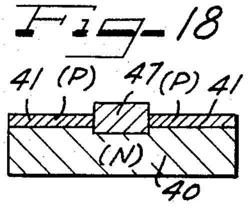

A second method of fabrication of a device embodying the present invention is shown in FIG. 14 to FIG. 19. The N-type silicon substrate 40 is covered by a $Si_3N_4$ layer 46 (FIG. 14) and the layer 46 is etched selectively making a plurality of windows (FIG. 15). After selective thermal-oxidation a thick silicon-dioxide ($SiO_2$) layer 47 (FIG. 16) is formed, and the silicon-nitride layer ($Si_3N_4$) is removed (FIG. 17). The P-type layer is selectively formed by a diffusion technique forming a plurality of island areas unidirectionally arrayed (FIG. 18). The depth of the layer 41 is shallower than the bottom of the $SiO_2$ layer 47. After the $SiO_2$ layer 47 is removed, the second oxide layer 44 is formed covering the N-type surface and P-type island areas. The plurality of metal layers 45 deposited (FIG. 19) to form gate electrodes.

Figure 21:
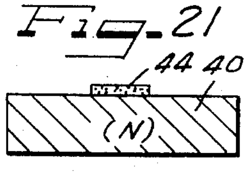
Figure 23:
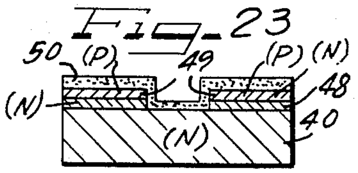
Figure 24:
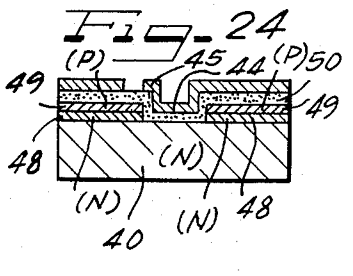

A third method of fabrication is shown in FIG. 20 to FIG. 24. A gate insulator 44, such as $SiO_2$, is formed on the N-type silicon substrate 40 (FIG. 20), and etched selectively (FIG. 21). Double epitaxial layers 48 and 49 are formed on the exposed silicon surface. The first layer 48 is N-type, the same as the substrate 40, and the second layer 49 is of P-type forming a plurality of island areas unidirectionally. The final insulating layer 50 is deposited on the island layer and the gate oxide layer (FIG. 23). A plurality of gate metal layers 45 are deposited selectively on the surface of the final insulating layer 50 (FIG. 24).

I claim as my invention:

1. The method of forming a charge transfer device which includes: taking an N-type silicon substrate; covering said substrate with a silicon nitride layer; selectively etching away portions of said silicon nitride layer and said substrate to form a plurality of windows having bottoms below the silicon nitride layer, forming a first layer of thick silicon dioxide by thermal oxidation in said windows, removing the silicon nitride layer; selectively forming a P-type layer by diffusion technique to form a plurality of island areas unidirectionally arrayed, the depth of the P-type layer being shallower than the bottom of the silicon dioxide layer; removing said first silicon dioxide layer; forming a second oxide layer covering the N-type surface of said substrate and the P-type island areas; and depositing a plurality of metal layers to form gate electrodes and each gate electrode covering a portion of the N-type substrate and overlying a substantial portion of an adjacent P-type layer.

2. The method of forming a charge transfer device which includes: taking an N-type silicon substrate; forming a gate oxide insulator on said substrate; selectively removing said gate insulator to form a plurality of islands, forming double epitaxial layers on the islands of the substrate surface, the first layer being of N-type and the second layer being of P-type, said plurality of island areas located in a line; depositing a final insulating layer on said island layer and said gate oxide layer; and forming a plurality of gate metal layers on the surface of said final insulating layer and each gate metal layers covering an island and overlying a substantial portion of an adjacent P-type layer.

* * * * *